United States Patent [19]
Hodge

[11] 3,915,966
[45] Oct. 28, 1975

[54] MORPHOLINO ZEARALINS
[75] Inventor: Edward B. Hodge, Terre Haute, Ind.
[73] Assignee: Commercial Solvents Corporation, Terre Haute, Ind.
[22] Filed: Jan. 21, 1974
[21] Appl. No.: 435,294

[52] U.S. Cl. ............................ 260/247.2 B; 424/248
[51] Int. Cl. .............................................. C07d 87/36
[58] Field of Search ............................. 260/247.2 B

[56] References Cited
OTHER PUBLICATIONS
W. H. Urry, Tetrahedron Letters, 1966, (27) 3109–3114.
Vanden Heuvel, W. J. A., Separ. Sci., 1968, 3(2) 151–163.

*Primary Examiner*—Robert Gerstl
*Assistant Examiner*—Paul J. Killos
*Attorney, Agent, or Firm*—Morton, Bernard, Brown, Roberts and Sutherland

[57] ABSTRACT
Resorcyclic acid lactone compounds of the formula

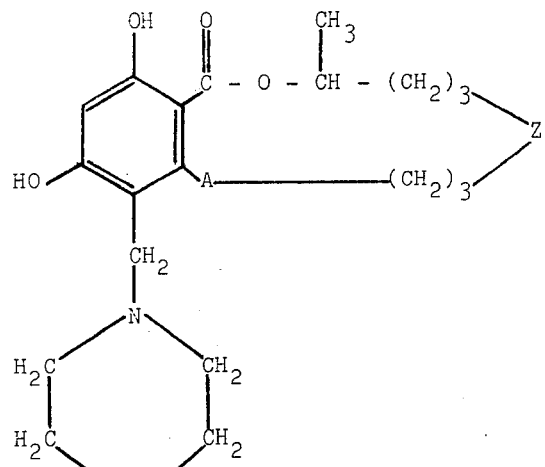

wherein —A— is either —CH$_2$—CH$_2$— or —CH=CH—, and $>$Z is either $>$CH$_2$, $>$C=O or $>$CH-OH, and their derivatives are provided for anabolic and estrogenic activity and as ruminant growth promoters.

5 Claims, No Drawings

MORPHOLINO ZEARALINS

This invention relates to novel compounds having anabolic and estrogenic properties. More particularly, it relates to compounds that can be prepared by reacting morpholine and formaldehyde with various resorcylic acid lactone derivatives.

The compounds of the present invention, hereinafter referred to as the M compounds, are those of the formula:

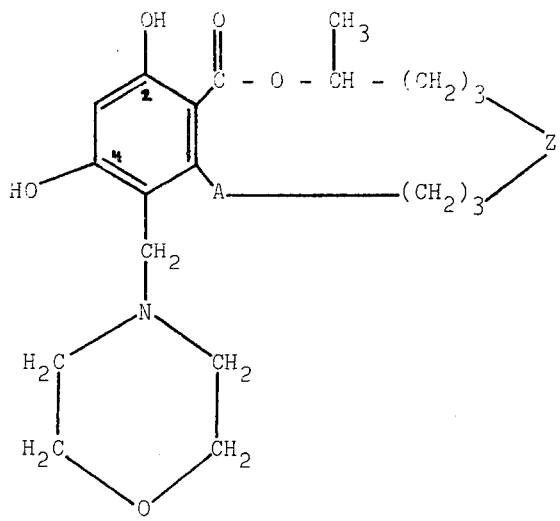

wherein —A— is either —CH$_2$—CH$_2$— or —CH=CH—, and $>$Z is either $>$CH$_2$, $>$C=O or $>$CH-OH.

The hydrogen of the hydroxyl groups in the second and fourth positions of the resorcylic acid lactone part of the molecule can be substituted, for instance with substituted and unsubstituted alkyl, e.g., containing from 1 to about 15 carbon atoms including lower alkyl such as methyl, ethyl, hexyl, etc., and cycloalkyl, particularly monocyclic cycloalkyl of about 5 to 8 carbon atoms, such as cyclopentyl, cyclohexyl, methyl cyclohexyl, etc.; alkanoyl, generally containing 1 to about 25 or more carbon atoms including lower alkanoyl such as acetyl, propionyl, valeryl, etc.; substituted or unsubstituted aryl, for instance, monocyclic aryl containing about 6 to 10 carbon atoms or more, such as phenyl, tolyl, etc.; and aryl alkyl (that is an alkyl group having an aryl substituent thereon), wherein the aryl substituent may be monocyclic aryl containing about 6 to 10 carbon atoms or more and the alkyl group is generally lower alkyl, for example, 1 to about 6 carbon atoms, examples of such aryl alkyl compounds including benzyl, bromobenzyl, tolyl methyl, and the like.

The M compounds can be prepared by simultaneously reacting morpholine, or a reactable derivative of it, and formaldehyde with a resorcylic acid lactone, hereinafter referred to as "zearalin," of the formula:

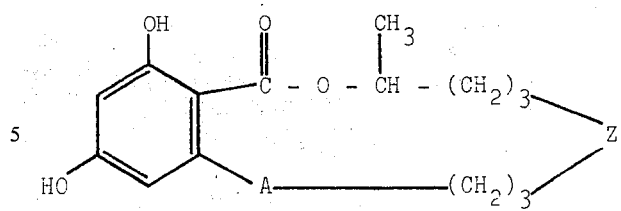

wherein —A—, and $>$Z, are as defined above.

The reaction of the morpholine, or a derivative of it, formaldehyde, and zearalin derivative to prepare the M compounds can generally be effected at about 25° to 150°C., preferably about 60° to 100°C., and preferably the reactants are in solution in solvent-providing amounts at an inert solvent such as isopropanol, ethanol, methanol, or alkyl ethers. The solvent is frequently provided in an amount of 1 to 100 or more, particularly 3 to 50, times by weight, of the zearalin. Reaction time will vary depending upon the particular zearalin employed, temperatures used, etc., but the reaction will often be complete in about 3 hours or less, for instance, about 0.1 to 2.5 hours. The ratios of the reactants to be employed in the reaction mixture are generally about 1 to 5 moles of formaldehyde and about 1 to 5 moles of morpholine, per mole of the zearalin. Preferably, the molar ratio of formaldehyde to morpholine used will be in the range of about 1:1 to about 2:1.

Recovery and refinement of the compounds of the present invention can be by conventional techniques, for example by crystallization, filtration, and recrystallization.

The zearalins employed making the M compounds can be prepared by known methods. Zearalins can be prepared, for instance, from zearalenone (—A— is —CH=CH—, and $>$Z is $>$C=O), which can be obtained by cultivation of the microorganism *Gibberella zeae* (Gordon) in a suitable fermentation medium, as described, for example, in U.S. Pat. No. 3,196,019.

Zearalenone may conveniently be employed to prepare others of the zearalins which may be used to provide the M compounds. For instance, the unsaturated carbon bond in the lactone zearalenone ring can be hydrogenated according to the procedure of U.S. Pat. No. 3,239,354. The keto group of zearalenone may be converted to $>$CHOH by the procedure disclosed in U.S. Pat. No. 3,239,341. The keto group of zearalenone may be connected to $>$CH$_2$ by a procedure also disclosed in U.S. Pat. No. 3,237,341. Replacement of the hydrogen of the hydroxy groups of the zearalins with an alkyl, alkanoyl, aryl, or aryl alkyl radical is disclosed in U.S. Pat. Nos. 3,239,342, 3,239,347, and the above-mentioned patents.

Zearalenone, obtained by fermentation, as in U.S. Pat. No. 3,196,019, is in the trans-configuration. Trans-zearalenone, or zearalins prepared therefrom, wherein A is —CH=CH—, may be converted to the corresponding cis configuration by electromagnetic irradiation of the trans isomer in the 2,800–3,500 angstrom wave length range, as disclosed in U.S. Pat. Application Ser. No. 317,117, filed Dec. 21, 1972, now abandoned.

Zearalenone, obtained by fermentation as in U.S. Pat. No. 3,196,019, is an S conformer. The R conformer of zearalanone may be obtained from S-zearalenone by the procedure of U.S. Pat. Application Ser. No. 452,260, filed Mar. 18, 1974.

Zearalins, wherein $$>Z \text{ is } >CHOH,$$

can, and do, exist in two different diastereoisomeric arrangements based on the substitutions on the $$>Z$$

carbon atom. Diastereoisomers, or "diamers" as they are commonly called, are stereoisomers which are not enantiomorphs (i.e., are not mirror images). These diamers have different melting points and, for that reason, can be distinguished as the low melting diamer and the high melting diamer. One process for further separation of the diastereoisomers of zearalanol is disclosed in U.S. Pat. No. 3,687,982.

The M compounds can be administered to ruminants, either orally or parenterally, in amounts sufficient to enhance the growth rate of the animal. Female ruminants are the preferred hosts for enhanced growth. The amount of M compound administered to an animal varies, of course, upon the animal, the desired rate of growth, and the like. The M compound is frequently administered in an amount of about 1 to 200, preferably 1 to 50 milligrams per head per day.

The M compound can be administered in combination with a pharmaceutically-acceptable carrier. For example, the M compound can be employed as an additive in their feed or as an implant under the skin. For example, the compounds can be blended with ordinary feed which contains nutritional values in an amount sufficient to produce the desired rate of growth, or the compounds can be suspended in a suitable injection suspension medium, such as peanut oil, and injected parenterally. From 2.5 to 50 grams of the compound per ton of feed is typical. When an implant is used, for example a ball or cylindrical implant inserted under the skin on the ear of an animal, the implant will generally contain from 1 mg. to 100 mg. of the compound. Other modes of parenteral administration include intramuscular, intravenous, and intraperitoneal injections.

When an M compound is to be administered to ruminants in their feed, a feed composition may be prepared containing the usual nutritionally balanced quantities of carbohydrates, proteins, vitamins, and minerals, together with the compound. Some of the usual sources of these dietary elements are grains, such as ground grain and grain by-products; animal protein substances, such as those found in fish meal and meat scraps; vegetable proteins, such as soybean oil meal or peanut oil meal; vitaminaceous materials, e.g., mixture of vitamins A and D, riboflavin supplements and other vitamin B complex members; and bone meal and limestone to provide minerals. A type of conventional feed material for use with cattle, for example, includes alfalfa hay and ground corn cobs, together with supplementary vitaminaceous substances if desired.

The following examples are offered to illustrate this invention; however, the invention is not limited to the specific materials, amounts, and procedures set forth.

EXAMPLE I

This example illustrates the preparation of 5-morpholinomethyl zearalenone, i.e., the compound of the formula:

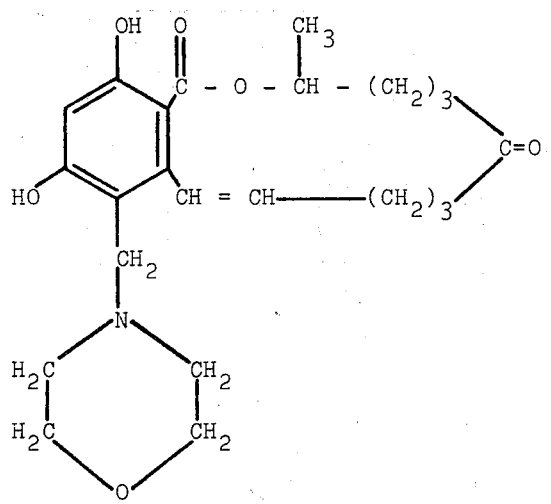

A mixture of 50 cc. of isopropanol, 3.8 g. of trans-zearalenone, 1.0 ml. of a 37 weight percent aqueous solution of formaldehyde, and 1.0 ml. of morpholine are reacted for 2 hours on a steam bath. The resultant solution is then cooled for 3 hours in a refrigerator, whereupon 3.8 grams of trans-5-morpholinomethyl zearalenone crystallizes out of the solution. The crystals are separated from their mother liquor by filtration and are observed to have a melting point of 162°–163°C.

EXAMPLE II

This example illustrates the preparation of 5-morpholinomethyl zearalanol, i.e. the compound of the formula:

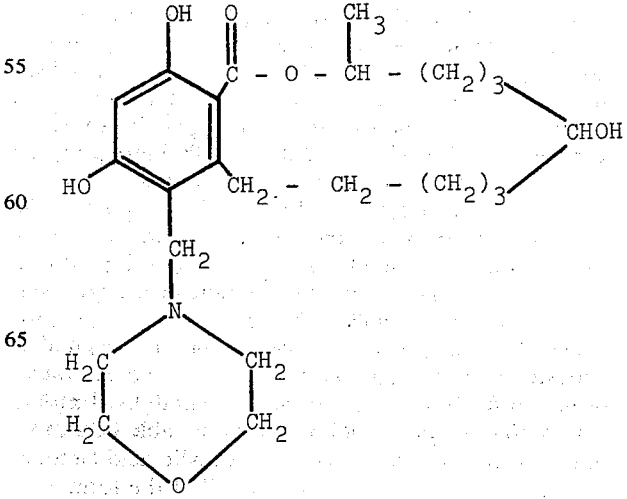

A mixture of 50 cc. of isopropanol, 3.8 g. of the high melting diamer of zearalanol, 1.0 ml. of a 37 weight percent aqueous solution of formaldehyde, and 1.0 ml. of morpholine are reacted for 2 hours on a steam bath. The resultant solution is then cooled for 3 hours in a refrigerator, whereupon 3.8 grams of 5-morpholinomethyl zeralanol crystallizes out of the solution. The crystals are separated from their mother liquor by filtration and are observed to have a melting point of 164°–169°C. Recrystallization from 15 ml. of isopropanol gives 1.2 grams of 5-morpholinomethyl zearalanol having a melting point of 165°–167°C.

EXAMPLE III

This example illustrates the estrogenic activities of 5-morpholinomethyl zearalenone and 5-morpholinomethyl zearalanol.

Samples of trans-5-morpholinomethyl zearalenone and 5-morpholinomethyl zearalanol are tested for uterotropic activity according to the well known mouse uterine test. This test consists of feeding the test material in admixture with a standard feed, to eight, adult, ovariectomized female mice at a ration of 3 grams per day for a 5 day period. On day six, the animals are weighed and sacrificed, and their uteri removed and weighed. Estrogenic activity is confirmed if the uterus of the test mouse is heavier and accounts for a greater percentage of the mouse's body weight than the uterus of a control mouse. Test results are reported in Table I.

TABLE I

| Test Compound | Daily Dose (ug/g/feed) | % Body Wt. |
|---|---|---|
| Control | — | 0.057 |
| trans-5-morpholinomethyl zearalenone | 500 | 0.132 |
| 5-morpholinomethyl zearalanol | 500 | 0.149 |

EXAMPLE IV

This example illustrates the use of 5-morpholinomethyl zearalenone as a growth promoting supplement in animal feed.

For young beef cattle, i.e., calves to yearlings running to 2 year olds, each animal is given 5 to 20 milligrams per day of trans-5-morpholinomethyl zearalenone intimately admixed in about 18 to 22 pounds per head per day of a complete pelleted ration for about 180 days. The complete pelleted ration includes, in addition to trans-5-morpholinomethyl zearalenone, the following:

| | | |
|---|---|---|
| Barley, | weight percent | 40–43 |
| Molasses dried beet pulp, | " | 34.5–37.5 |
| Alfalfa pellets, | " | 8.0 |
| Tallow, | " | 2.5 |
| Calcium carbonate, | " | .30 |
| Urea, | " | .30 |
| Phosphorus source, | " | .40 |
| Salt, | " | .50 |
| Molasses, | " | 10.00 |
| Trace mineral, | " | 0.5 |
| Vitamin A, | MMI.U/ton | 2–4 |

Note: Milo or corn, for example, can be substituted for the barley.

The trans-5-morpholinomethyl zearalenone is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg/head/day |
|---|---|
| 0.5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

EXAMPLE V

This example illustrates the use of 5-morpholinomethyl zearalanol as a growth promoting supplement in animal feed.

For young swine, i.e., 6 week old pigs to about 100 pound pigs, each animal is given 5 to 2 milligrams per day of 5-morpholinomethyl zearalanol intimately admixed in about 1½ to 5½ pounds per head per day of a grower ration until it reaches a weight of about 100 pounds. When the swine weigh between 90 and 125 pounds, the feed is changed to one whereby each animal is given 20 to 50 milligrams per day of the compound intimately admixed in about 5½ to 10 pounds per head per day of a finisher ration until it reaches market weight of about 220 pounds. The grower and finisher ration include, in addition to the 5-morpholinomethyl zearalanol, the following:

| Ingredients | Grower, wt. % | Finisher, wt. % |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The 5-morpholinomethyl zearalanol is admixed with the above ingredients in a blender in the following amounts in milligrams per pound to provide an appropriate feed with dosage levels ranging from 6 to 96 milligrams per head per day.

| Mg/pound: | Mg/head/day |
|---|---|
| 2 | 6 |
| 4 | 12 |
| 8 | 24 |
| 16 | 48 |
| 32 | 96 |

EXAMPLES VI TO IX

The procedure of Example I is essentially repeated, except employing different zearalins to provide other M compounds of this invention. The zearalins, which are employed, have the formula:

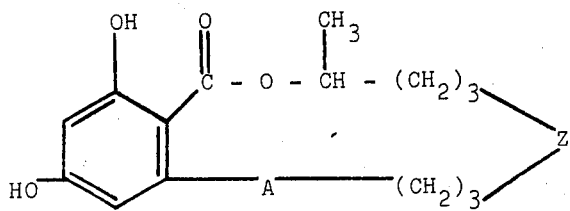

to provide an M compound of the formula

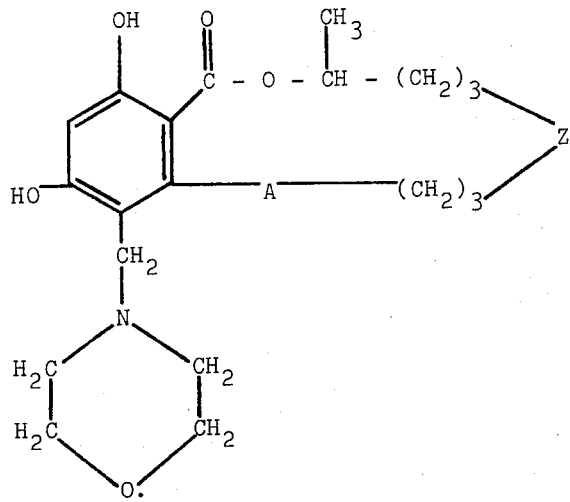

The values for A and Z for both the zearalin and resulting M compound are provided in Table II. The M compounds are orally administered to young swine in accordance with the procedure set forth in Example V to provide enhanced animal growth rate.

TABLE II

|      | A           | Z      |
|------|-------------|--------|
| VI   | $-CH_2-CH_2-$ | $>C=O$ |
| VII  | $-CH_2-CH_2-$ | $>CH_2$ |
| VIII | $-CH_2-CH_2-$ | $>CHOH$ |
| IX   | $-CH=CH-$   | $>C=O$ |

I claim:
1. A compound of the formula:

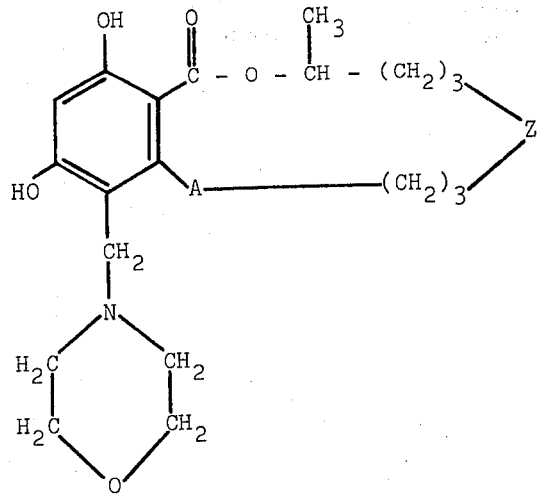

wherein —A— is either —CH$_2$—CH$_2$— or —CH=CH—, and $>Z$ is either $>CH_2$, $>C=O$ or $>CH-OH$.

2. The compound of claim 1 wherein —A— is —CH$_2$—CH$_2$—.

3. The compound of claim 2 wherein $>Z$ is $>CH-OH$.

4. The compound of claim 1 wherein —A— is —CH=CH—.

5. The compound of claim 4 wherein $>Z$ is $>C=O$.

* * * * *